United States Patent [19]

Newman

[11] 3,770,562
[45] Nov. 6, 1973

[54] COMPOSITE NONWOVEN FABRICS

[75] Inventor: Nicholas S. Newman, West Newton, Mass.

[73] Assignee: The Kendall Company, Walpole, Mass.

[22] Filed: Sept. 9, 1971

[21] Appl. No.: 178,931

[52] U.S. Cl................ 161/156, 156/313, 161/157, 161/170
[51] Int. Cl............................................. B32b 5/22
[58] Field of Search............... 156/290, 300, 297, 156/309, 313, 306; 161/128, 146, 148, 150, 151, 152, 154, 155, 156, 157, 170

[56] References Cited
UNITED STATES PATENTS

| 3,509,009 | 4/1970 | Hartmann | 161/150 |
| 3,423,266 | 1/1969 | Davies et al. | 161/150 |
| 3,276,944 | 10/1966 | Levy | 161/157 |
| 3,595,731 | 7/1971 | Davies et al. | 161/156 |
| 3,341,394 | 9/1967 | Kinney | 161/150 |

*Primary Examiner*—Harold Ansher
*Assistant Examiner*—James J. Bell
*Attorney*—John F. Ryan

[57] ABSTRACT

A soft and flexible spun-bond web having a cantilever drape index of not over 1.25 inches in machine or cross direction is impregnated with a soft thermoplastic binder, dried, and then plied by heat and pressure to at least one substantially binder-free fibrous layer at a temperature insufficient to cause autogenous fusion of the filaments of the spun-bond web but sufficient to cause bonding of the fibers of the fibrous layer to each other and to the spun-bond web.

5 Claims, 4 Drawing Figures

PATENTED NOV 6 1973 3,770,562

LIGHTLY BONDED SPUN-BOND WEB

SPUN-BOND WEB IMPREGNATED WITH THERMOPLASTIC BINDER

COMPOSITE NONWOVEN FABRICS

This invention relates to the preparation of nonwoven fabrics of laminated structure, especially suitable for use as a disposable gown material, surgical drape, and the like. More particularly, it relates to nonwoven laminates comprising a layer of spun-bonded filamentary material, to at least one face of which is bonded a binder-free fibrous layer.

In the preparation of nonwoven fabrics suitable for use in fashioning disposable garments, surgical drapes, and the like, certain strength requirements must be met, in order to guard against tearing. Since in general the strength of nonwoven fabrics is borderline in such usage, nonwovens developed for such uses are generally laminated structures, wherein layers of tissue are fortified with an inner layer of woven gauze of cross-laid filaments, to which the tissue layers are adhesively united. Such laminated structures, however, are often lacking in softness and drape, and do not have the conformability desirable in a disposable gown.

It has been found that a spun-bonded fleece of substantially continuous filaments, although a low strength per se, nevertheless serves to impart an unexpected degree of reinforcement to a nonwoven laminate when employed according to the process of this invention.

It is an object of the invention to prepare a nonwoven laminate which combines high tensile strength and particularly high tear strength with a high degree of conformability and drape.

Other objects of the invention will be apparent from the following description and drawings, in which.

Figure 1:
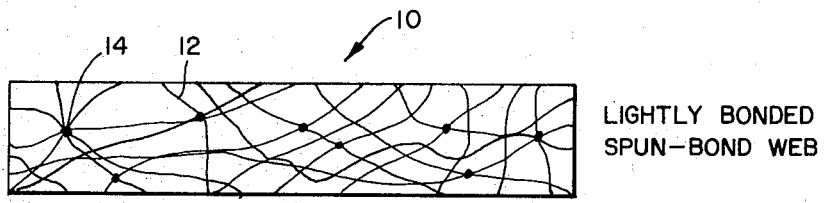
FIG. 1 is a cross-sectional schematic view of a spun-bonded web suitable for the inner layer of the laminates of this invention.

Referring to FIG. 1, there is shown a spun-bonded web 10 comprising continuous or semi-continuous filaments 12 either unbonded or lightly bonded to each other at a minority of the crossover points of said filaments. A spun-bonded web is defined herein as a web or nexus of substantially continuous synthetic filaments resulting from the deposition of a synthetic polymer from a bank of spinnerettes onto a conveyor belt. When a purpose of the spun-bonded web is to add cross-wise tensile and tear strength to the final combination, it is preferred that the filaments be either randomly oriented, or have a substantial orientation component in the cross direction. The type of spun-bonded web of particular utility in this invention is one wherein the entangled or interlaced filaments are either unbonded, or are bonded at a few of the filamentary crossover points 14 for handling purposes, where a certain low degree of tensile strength is desirable to allow the web to be wound and unwound for further processing. This is conveniently accomplished by the application of heat and pressure to the web at a set of discrete and spaced-apart points, thus affecting an autogenous bonding of filament to filament.

Two types of spun-bonded webs may be employed in the process of this invention. If the spun-bonding operation is set up "in line" with the subsequent bonding and laminating steps, an unbonded nexus of synthetic filaments may be saturated in line with a thermoplastic binder, the nature of which is described below, and then laminated on one or both faces with a binder-free layer of textile-length fibers.

More commonly, the binder saturation and lamination steps are carried out on a lightly prebonded spun-bonded web, where for handling purposes the continuous filaments are bonded to each other at between 5 percent and 10 percent of their crossover points. This allows the spun-bonded web to be manufactured by those firms which have the expensive spinnerette apparatus and a source of polymer, and to ship the lightly bonded material as a commodity to converters who wish to utilize it in subsequent operations.

Attempts to employ the over-all autogenously bonded spun-bond webs of commerce have not been very satisfacory in the practice of this invention, due to their basic stiffness and lack of conformability.

As an illustration, a spot-bonded spun-bond polyester web weighing 0.8 ounce per square yard had tensile strengths of 0.58 pounds M.D., 0.12 pounds C.D. (In this application, M.D. and C.D. refer to machine direction and cross direction respectively, and all tensile strengths are measured on 1 inch wide strips). Tear strengths were 0.57 pounds M.D. and 0.24 pounds C.D.; cantilever drape index of 1.04 inches M.D., 0.72 inches C.D., Federal Test Method 191-5204. The comparable figures for a completely autogenously bonded polyester counterpart of the same weight and composition were: tensiles, 7.2 and 3.8 pounds: tear strengths, 1.6 and 2.4 pounds; cantilever drape, 1.76 and 1.18 inches. For the purposes of making soft, drapeable nonwoven fabrics according to this invention, it is preferred that the spun-bond web forming the inner layer have a cantilever drape index of not over 1.25 inches in machine or cross direction.

Figure 2:
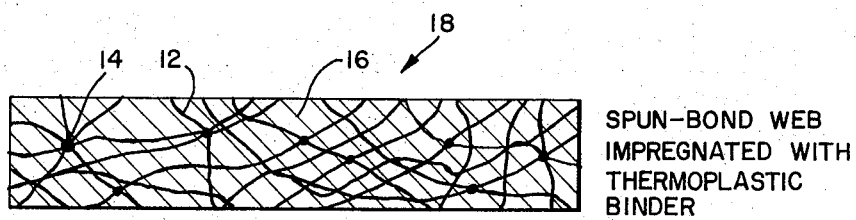
FIG. 2 is a similar representation of the web of FIG. 1 after saturation with a thermoplastic adhesive binder substance.

FIG. 2 represents the spun-bond web 18 of FIG. 1 after saturation with a thermoplastic binding agent of low softening temperature. In order to indicate the relationship of the filaments, the binder material is indicated stylistically by cross-hatching as at 16.

The binder may be applied to the web in solvent or dispersion form by padding, spraying, or other conventional means. Since the binder serves a triple function: (1) to bond the filaments of the spun-bonded web together; (2) to unite the fibers of the unbonded textile fibrous laminates together; and (3) to unite the fibrous laminates to the spun-bonded web, normally between 25 percent and 100 percent of the base weight of the spun-bonded web is added in binder content to said spun-bonded web.

In order to obtain the requisite softness and drape in the final product, it is desirable that a relatively soft polymeric binder be employed, with a softening temperature of not over 300° F. and a glass transition temperature of not over 10° C. Suitable binders include carboxylated polyethylacrylates such as Rhoplex B-15 (trademark of Rohm and Haas); plasticized polyvinyl chloride such as Geon 590-X6 (trademark of B. F. Goodrich); and butadieneacrylonitrile polymers (70-30) such as Hycar 1526 × 103 (also a trademark of B. F. Goodrich).

It is also essential that the nature of the polymeric binder, the fusion and flow temperature, and the dwell time be so selected that there is no autogenous fusion of the synthetic filaments in the spun-bonded web. In using spun-bonded webs of nylon or polyester filaments, polymeric binders which soften and flow at not over 300° F. will bond the various elements into a unified composite without causing fusion of nylon to nylon or polyester to polyester filaments.

Figure 3:
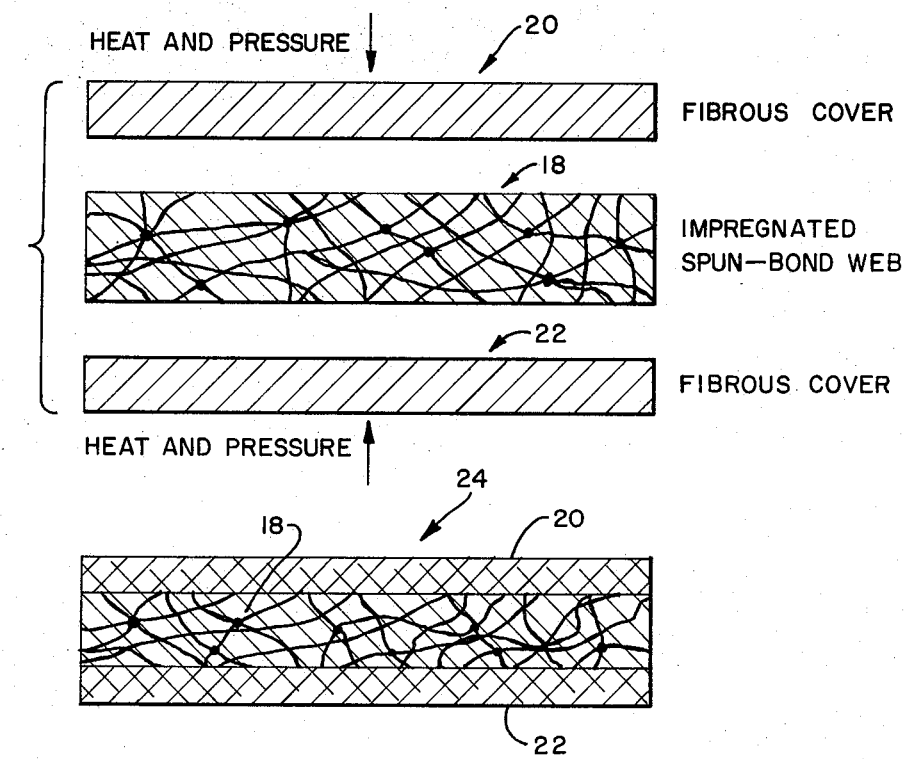
FIG. 3 represents the web of FIG. 2 with an outer covering fibrous layer applicable to each surface of the web.

FIG. 3 shows a pair of fibrous sheets, 20 and 22, positioned adjacent to either face of the impregnated spun-bond web 18. The fibrous sheets 20 and 22 are substantially unbonded and contain little or no capacity for self-bonding, being of the general nature of sheets of cellulose tissue, rayon or cotton card or garnett webs, mixed non-binder fiber webs such as blends of rayon fibers with nylon fibers or drawn polyester fibers, air-deposited short-fibered cellulosic webs, and the like. The webs may be the same or different, and if tissue webs are used they may be pretreated to impart such properties as water-repellancy, color, and the like.

In the general process of this invention, the base spun-bond web is impregnated with a suitable thermoplastic binder, as set forth above, after which it is dried. It is then plied with at least one layer of fibrous material on at least one of its faces, and the assembly is subjected to heat and pressure, as by a hot calendering operation.

Figure 4:
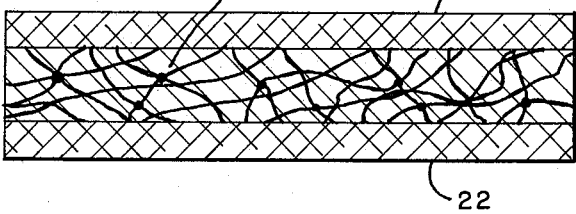
FIG. 4 represents the composite structure after the three elements of FIG. 3 have been combined by heat and pressure.

The result is the composite structure 24 of FIG. 4, wherein the fibrous outer layers 20 and 22 have been adhesively united to the spun-bond web 18 by virtue of the thermoplastic adhesive contained therein having been forced to flow into and to a substantial extent through the fibrous outer layers.

One advantage of this process of the invention is that the binder is concentrated most heavily in the center ply of the combination, where it is most effective in anchoring the filaments of the spun-bond web together. Conventional saturation techniques, where the three elements of the composite are saturated as a unit by the application of a binder dispersion and then dried, invariably lead to migration of the binder to the outer surface layers, thus impoverishing the center ply of binder, unduly enriching the outer layers, and leading to a product which delaminates readily.

The subjection of the three layers to heat and pressure, to cause the thermoplastic binder to soften and flow, may of course be effected by subjecting the assembly between heated platens, by calendering between smooth-faced heated calender rolls, by using embossed calendering rolls, or by spot-bonding between calender rolls described in U.S. Pat. No. 3,507,943.

When it is desired to produce composite structures wherein only one face of the binder-impregnated spun-bond web has a binder-free fibrous layer applied thereto, it is of course desirable that the heated calender roll which contacts the binder-containing surface of the spun-bond web be treated, as by a silicone coating, or made of silicone rubber so that no adhesion is developed between the thermoplastic binder and the roll surface.

One unexpected advantage of the process of this invention has been the discovery that even when a soft thermoplastic binder is employed, lightly bonded spun-bond webs of initial low tensile and tear strength develop tensile and tear strengths in excess of the same spun-bond web when completely autogenously bonded.

For example a lightly-bonded spun-bond web of polyester fibers, as set forth above, increased from 0.58 pounds M.D., 0.12 pounds C.D. to 7.2 pounds M.D., 3.8 pounds C.D. when over-all bonded by autogenous filament fusion. But when the lightly bonded web was impregnated with 50 percent of its own weight of a soft carboxylated polyethylacrylate binder, its strength increased to 11.2 pounds M.D., 5.8 pounds C.D.

Similarly, on the important parameter of tear strength, the lightly bonded web registered 0.57 pounds M.D., 0.24 pounds C.D. The same type of web, autogenously bonded by filament fusion, had tear strengths of 1.6 pounds M.D., 2.4 pounds C.D. But the impregnated web had tear strengths of 3.8 pounds M.D., 4.4 pounds C.D., or practically double the tear strength of the autogenously bonded sample. At the same time the impregnated sample was softer, and had a lower drape index.

In general, the spun-bond webs suitable for use in this invention are characterized by softness, having a cantilever drape index of 1.25 inches or less, and by being of a rather weak and readily penetrated nature, having tensile strengths of less than one pound per inch-wide strip in either the machine or the cross direction. After impregnation with a soft thermoplastic resin, the web normally displays a seven to ten-fold increase in tensile strength. Although the binder-free fibrous covers applied to the impregnated spun-bond web have substantially no tensile strength by themselves, nevertheless there is an additional two to three-fold increase in strength shown by the final composite over the strength of the impregnated web. Tear strengths of the finished products also shown substantial increases over the tear strengths of the base web or of any of the other components considered individually or in summation.

The invention will be illustrated by the following examples.

Example 1

A spun-bond web of randomly oriented polyester filaments, bonded at a minority of the filament crossover points, was employed as the base material. It weighed 0.4 ounces per square yard, and had tensile strengths of 0.43 pounds M.D., 0.37 pounds C.D.; tear strengths of 0.61 pounds M.D., 0.70 pounds C.D.; cantilever drape index of 1.0 inches.

The web was impregnated with 100 percent of its own weight (solids basis) of a thermoplastic binder, a carboxylated polyethylacrylate, in the form of a 23 percent aqueous dispersion, and dried. It was then placed between a pair of viscose rayon webs, 1.5 inch 1.5 denier, each weighing 12 grams per square yard, and the assembly was hot calendered in a steel roll-cotton roll nip, the steel roll being heated to 280° F. and the cotton roll to 180° F. Pressure was 700 pounds per inch of nip.

The composite product had tensile strengths of 11.3 pounds M.D., 6.5 pounds C.C.; tear strengths of 2.3 pounds M.D., 3.8 pounds C.D.; drape indices of 1.22 inches M.D., 0.87 inches C.D.

Example 2

The general procedure of Example 1 was repeated except that the impregnant was a plasticized polyvinyl chloride polymer, and the calendering conditions were 320° F. steel roll, 200° F. cotton roll, 900 pounds pressure per inch of nip.

The composite product had tensile strengths of 10.0 pounds M.D., 5.3 pounds C.D.; tear strengths of 3.8 pounds M.D., 3.1 pounds C.D.; drape indices of 1.24 inches M.D., 1.00 inches C.D.

Example 3

The general procedure of Examples 1 and 2 was followed except that the impregnant was a butadiene (70 percent) - acrylonitrile (30 percent) thermoplastic copolymer. Calendering conditions were as in Example 1.

The composite product has tensile strengths of 7.0 pounds M.D., 4.5 pounds C.D.; tear strengths of 3.0 pounds M.D. and C.D., and drape indices of 1.02 inches M.D., 0.73 inches C.D.

Example 4

The spun-bond web of Example 1, impregnated with an equal weight of carboxylated polyethylacrylate binder, was plied on one face with a single 12 gram layer of rayon web similar to the rayon webs of Example 1. Calendering was done at 50 pounds pressure per inch of nip between a steel roll heated to 400° F. and a silicone rubber roll heated to 200° F., with the rayon surface against the steel roll.

The composite product had tensile strengths of 4.1 pounds M.D., 5.0 pounds C.D.; tear strengths of 1.2 pounds M.D., 1.4 pounds C.D.; and drape indices of 0.83 inches M.D., 0.63 inches C.D.

Example 5

The process of Example 1 was repeated except that the outer webs were a blend of 80 percent 3 denier 1.5 inch nylon - 20 percent 1.5 denier 1.5 inch viscose rayon. Calendering conditions were the same.

The composite material had tensile strengths of 7.1 pounds M.D., 4.7 pounds C.D.; tear strengths of 1.8 pounds M.D., 3.1 pounds C.D.; drape indices of 1.04 inches M.D., 0.71 inches C.D.

Example 6

The spun-bond web of Examples 1, 4, and 5, impregnated with an equal weight of carboxylated polyethylacrylate, was plied on one face with a 12 gram per square yard, 1.5 denier, 1.5 inch carded viscose rayon web and on the other face with a soft, creped layer of cellulose tissue weighing 20 grams per square yard.

The assembly was then unified by a spot-bonding process, under heat and pressure, by passing it between two heated helically-grooved rolls according to the process set forth in U.S. Pat. No. 3,507,943. The temperature of the rolls was 420° – 420° F., and the pressure was 125 pounds per inch of nip.

The composite structure had tensile strengths of 5.1 pounds M.D., 3.4 pounds C.D.; tear strengths of 1.5 pounds M.D. and C.D.; and drape indices of 1.04 inches M.D., 1.12 inches C.D.

In designing the products of this invention for use as surgical drape material, the use of at least one layer of cellulose tissue is particularly desirable, since during the manufacture of the tissue it can be colored and made water repellant, so that a suitable drape material can be thus produced without further wet processing.

Example 7

A spun-bond web of continuous polyamide filaments weighing 0.4 ounces per square yard was employed as base material. The filaments of the web were bonded at a minority of their crossover points by autogenous bonding, and the physical constants were: tensile strength 0.48 pounds M.D., 0.23 pounds C.D.; tear strength 0.33 pounds M.D., 0.22 pounds C.D.; drape indices 0.65 inches M.D., 0.41 inches C.D. The base web was impregnated with 75 percent of its own weight of a carboxylated polyethylacrylate thermoplastic binder and dried. The impregnated spun-bond web had tensile strengths of 7.3 pounds M.D., 410 pounds C.D.; tear strengths of 1.71 pounds M.D., 211 pounds C.D.; drape indices of 0.67 inches M.D., 0.55 inches C.D.

It was then placed between a pair of viscose rayon card webs, 1.5 inch, 1.5 denier, each weighing 12 grams per square yard, and the assembly was hot calendered in a steel roll-cotton roll nip with the steel roll heated to 280° F. and the cotton roll to 180° F. Pressure was 700 pounds per inch of nip.

The composite product had tensile strengths of 14.5 pounds M.D., 5.8 pounds C.D.; tear strengths of 2.40 pounds M.D., 3.30 pounds C.D.; drape indices of 1.21 inches M.D., 0.72 inches C.D.

Example 8

The procedure of Example 7 was repeated on a lightly autogenously bonded spun-bond web of continuous polypropylene filaments weighing 0.5 grams per square yard. The base web had tensile strengths of 0.56 pounds M.D., 0.41 pounds C.D.; tear strengths of 0.39 pounds M.D., 0.32 pounds C.D.; drape indices of 0.63 inches M.D. and C.D.

The impregnated spun-bond web had tensile strengths of 4.70 pounds M.D., 3.97 pounds C.D.; tear strengths of 2.51 pounds M.D., 2.75 pounds C.D.; drape indices of 0.81 inches M.D.; 0.75 inches C.D.

The composite product had tensile strengths of 13.7 pounds M.D., 7.50 pounds C.D.; tear strengths of 3.48 pounds M.D., 3.75 pounds C.D.; drape indices of 1.24 inches M.D., 0.83 inches C.D.

Having thus described my invention I claim:

1. A composite nonwoven fabric which comprises:
   a first layer comprising a spun-bond web of substantially continuous filaments impregnated with a soft thermoplastic binder, said thermoplastic binder having a softening temperature of not over 300° F and a glass transition temperature of not over 10° C, said web, prior to impregnation, having a substantial orientation component in the cross direction, a cantilever drape index of not over 1.25 inches in both machine and cross direction, and a tensile strength of less than one pound per inch-wide strip in both machine and cross direction;
   at least one additional fibrous layer being bonded to at least one face of said first layer,
   said thermoplastic binder being substantially the sole bonding means uniting said spun-bond web to said at least one additional fibrous layer.

2. The product according to claim 1 wherein said spun-bond web comprises filaments selected from the class consisting of polyester, polyamide, and polypropylene filaments.

3. The product according to claim 1 wherein said at least one additional fibrous layer is a layer of textile-length fibers.

4. The product according to claim 1 wherein the fibrous layer bonded to the spun-bond web is a layer of cellulose tissue.

5. The product according to claim 1 wherein said spun-bonded web is prebonded at between 5 percent and 10 percent of the filament crossover points prior to impregnation with the binder material.

* * * * *